July 30, 1963 F. L. POST 3,099,821

MAGNETIC CORE DEVICE

Filed Sept. 22, 1959 5 Sheets-Sheet 1

INVENTOR.
FREDERICK L. POST

BY Darby & Darby

ATTORNEYS

July 30, 1963 F. L. POST 3,099,821

MAGNETIC CORE DEVICE

Filed Sept. 22, 1959 5 Sheets-Sheet 2

INVENTOR.
FREDERICK L. POST
BY Darby & Darby
ATTORNEYS

MAGNETIC CORE DEVICE

Filed Sept. 22, 1959 5 Sheets-Sheet 3

INVENTOR.
FREDERICK L. POST
BY
Darby & Darby
ATTORNEYS

INVENTOR.
FREDERICK L. POST
BY
Darby & Darby
ATTORNEYS

July 30, 1963 F. L. POST 3,099,821

MAGNETIC CORE DEVICE

Filed Sept. 22, 1959 5 Sheets-Sheet 5

INVENTOR.
FREDERICK L. POST
BY Darby & Darby
ATTORNEYS

United States Patent Office 3,099,821

Patented July 30, 1963

3,099,821
MAGNETIC CORE DEVICE

Frederick L. Post, Poughkeepsie, N.Y., assignor to International Business Machines Corporation, New York, N.Y., a corporation of New York Filed Sept. 22, 1959, Ser. No. 841,487
18 Claims. (Cl. 340—174)

This invention relates to magnetic devices and more particularly to improvements in magnetic core devices for use in data storage systems and the like.

Magnetic core devices are often employed in data processing systems of the binary type as magnetic storage or "memory" elements. When the core portions of the devices are formed of a material having two stable magnetic states, the devices may be made to exhibit data storage characteristics by arbitrarily assigning a different value or meaning to each of the two magnetic states. For example, in a binary system, one magnetic state may be said to represent a binary "0" and the other magnetic state a binary "1." By suitably driving the magnetic core device to switch it from one magnetic state to the other, it is possible to perform functions, such as "writing in" or "reading out" bits of information.

The copending patent application of Samuel K. Raker, Serial No. 619,484, filed October 31, 1956, now Patent No. 2,923,923, issued February 2, 1960, discloses and claims a magnetic core device which exhibits high switching speeds. The core device of the Raker application operates on a biased coincidence flux selection principle and may be switched from one stable magnetic state to the other by the simultaneous application of a plurality of drive pulses. This feature permits the core device to be used in two-dimensional magnetic storage matrices which consist basically of a "plane" or "array" of cores. Each core in a plane serves to store one binary bit of information. By arranging the cores of a plane in rows and columns and utilizing a common drive winding for the cores of each row and column, it is possible to select a particular core device in the plane for either a reading or writing operation. This is often referred to as "two-dimensional" reading or writing. When the drive winding linking the cores in a particular row or column in the plane is energized, the cores will not switch, since they are only "half-selected." However, when the second drive winding linking a particular core in that row or column is simultaneously energized, that core is "fully selected" and will switch.

The magnetic core device of the aforementioned Raker application operates in a manner to read out the binary bit of information stored therein by the previous writing operation. For example, if a binary "1" is written into the device during the writing operation, a binary "1" will be read out of the device during the next succeeding reading opertaion. Similarly, if a binary "0" is written into the core device, a binary "0" will be read out. However, for certain applications, it is desirable that the magnetic core device be capable of being "cleared" before being read out. For example, if a binary "1" is written into the core, it is desirable that the core be cleared to the binary "0" state before the reading operation takes place, so that a binary "0" may be read out.

An application where this type of operation is desired may be found in the magnetic core devices which form the "clear memory plane" in the system for logical clearing of memory disclosed in the copending patent application of Buchholz et al., Serial No. 783,754, filed December 30, 1958. In the system described in the above-mentioned Buchholz et al. application, a plurality of magnetic core devices are arranged in a "clear memory plane" to indicate whether a portion or "register" of the main memory associated with a particular core in the clear memory plane has a "word" or "character" stored in it. Each of the magnetic core devices forming the clear memory plane serves to indicate the informational content of a particular register of the main memory by storing either a binary "0" or a binary "1." The storage of a binary "0" in a core of the clear memory plane may arbitrarily serve to indicate that the portion of the main memory associated with that core is clear and may be employed for a subsequent storage operation. When a binary "1" is written into the core device, this may be given the meaning that the portion of the main memory associated with that core is not available for a subsequent writing operation, since there is information presently stored in it. As explained in the Buchholz et al. application, the core devices of the clear memory plane serve only to indicate whether the information stored in the associated portion of the main memory is to be utilized or is to be disregarded. In this manner, it is possible to merely simulate the clearing of sections of the main memory for a counting operation, so that it is not necessary to wait for the actual physical clearing of the main memory cores of that section. Because of this, it is desirable that the cores of the clear memory plane be capable of being physically cleared, that is, being switched to the binary "0" state before the core is read out. This, of course, requires that when a binary "1" is written into a core device in the clear memory plane, the core must be returned to the binary "0" state before the next reading operation, so that a binary "0" is read out of the core instead of a binary "1."

Accordingly, it is an object of this invention to provide a magnetic core device which is capable of being cleared before being read out.

It is a further object of this invention to provide a magnetic core device which may be utilized in the clear memory planes of systems for logically clearing memory.

It is a still further object of this invention to provide a magnetic memory array wherein a plurality of the core devices forming the array may be simultaneously cleared before being read out.

Briefly, the magnetic core device of the invention comprises means defining a closed magnetic circuit having first and second pairs of flux paths and a main flux path coupling the two pairs of flux paths together. Bias means are provided for magnetically biasing one path of the first pair of flux paths to saturation in a first direction and the other path of the first pair of paths to saturation in a second direction. Main drive means are provided for selectively opposing the bias in the paths of the first pair of flux paths, so that the direction of flux in either path may be reversed and a flux pattern may be established in the main flux path in either a first or a second direction. Additionally, auxiliary drive means are provided for driving one path of the first pair of flux paths to saturation in a direction to oppose the bias in that path, to thereby establish a flux pattern in the main flux path in a particular direction. By sensing the change in the flux pattern of one path of the second pair of flux paths, as by an output winding, for example, the core device may be read out to indicate the magnetic state of that path and hence the bit of information stored therein. Inasmuch as the auxiliary drive means links only one path of the first pair of flux paths, it is possible to switch the core to a pre-selected one of its stable magnetic states independently of the main drive means, so that the core may be cleared before reading. Therefore, when the main drive means is utilized to read out the core, it will read out the bit of information associated with the aforesaid preselected or cleared magnetic state of the core.

The invention also contemplates the formation of a magnetic memory array utilizing the magnetic core devices of the invention. The array comprises a plurality of groups of magnetic core devices wherein each group contains the same number of core devices. By utilizing first and second main drive winding means to obtain coincidence flux selection of the cores in the array, as by linking the core devices of a group with the first drive winding means and linking the corresponding core devices of each group by the second drive winding means, it is possible to individually select a particular core device in the array for a reading or writing operation. With the clear winding means arranged to link the cores of the array, the cores may be physically cleared independently of the main drive winding means. If desired, all of the core devices in a section of the array may be simultaneously cleared by utilizing first and second clear winding means arranged to link predetermined cores in the array, so that the cores in a given section are all linked by the same clear winding means.

Other objects of the invention will be pointed out in the following description and claims and illustrated in the accompanying drawings which disclose, by way of examples, the principle of the invention and the best mode, which has been contemplated, of applying that principle.

Figure 1A:
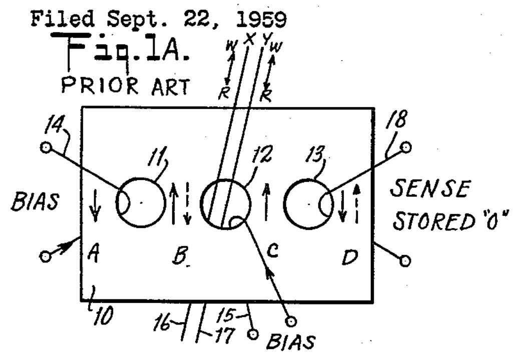
FIGS. 1A and 1B are schematic diagrams illustrating the basic operation of a magnetic core device, such as disclosed and claimed in the aforementioned Raker application, which utilizes the biased coincidence flux selection principle.
Figure 4:
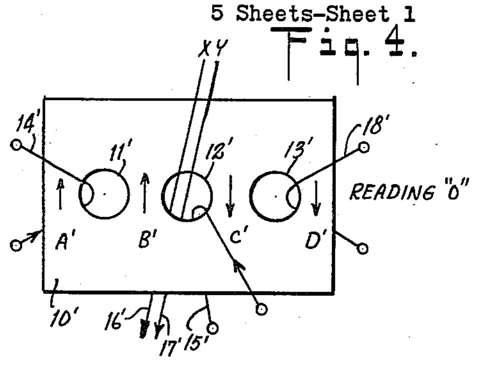
FIGS. 3–13 are schematic diagrams of the magnetic core device of the invention depicting the flux patterns therein for various reading, clearing and writing operations.

Referring now to FIG. 1A of the drawings, there is shown a magnetic core device of the type disclosed and claimed in the aforementioned Raker patent application. The device comprises a core 10 of magnetic material having two stable magnetic states. Apertures 11, 12 and 13 are formed in the core and serve to respectively define legs A, B, C and D. It may be noted that legs A and B form one pair of parallel-connected flux paths, while legs C and D form another pair of parallel-connected flux paths. Furthermore, legs B and C are arranged to respectively magnetically shunt legs A and D. Bias windings 14 and 15 are arranged to magnetically bias legs A and B to saturation in the directions indicated by the solid arrows. As explained in the aforementioned Raker application, bias winding 14 would be energized with a bias current having twice the magnitude of the bias current for winding 15. Drive windings 16 and 17 are arranged to link the main flux path of the core and to intersect aperture 12. Drive winding 16 is designated "X," while drive winding 17 is designated "Y," to indicate that they may be utilized for two-dimensional reading and writing when the core itself is employed in a magnetic memory array. A "sense" or output winding 18 is arranged to intersect aperture 13 and to link leg D of the core, so that it is responsive to changes in the flux pattern in that leg.

Figure 1B:
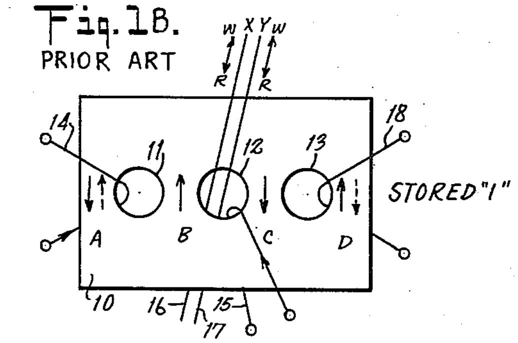

As indicated in the aforementioned Raker application, it is possible by simultaneously pulsing the drive windings 16 and 17 to change the direction of the flux in leg D of the core, so that the core may be made to store a binary "0" or a binary "1." By arbitrarily assigning a binary "0" designation to the downward direction of flux in leg D, as illustrated by the solid arrow in FIG. 1A, the core may be said to be in a quiescent state storing a binary "0." Assuming now that a binary "1" is to be written into the core, the drive windings 16 and 17 are simultaneously energized in the write polarity as illustrated by the arrows adjacent the windings, to provide a counterclockwise flux pattern for the core. Since the flux in leg A is already saturated in a downward direction, the flux in leg B switches to assume a downward direction as shown by the dotted arrow in that leg. Furthermore, since leg C is already saturated in an upward direction, the flux in leg D switches to an upward direction as shown by the dotted arrow. At the conclusion of the writing operation, when drive windings 16 and 17 are deenergized, the bias applied to leg B becomes effective to once more cause the flux in that leg to assume an upward direction. Because of the fact that the core 10 constitutes a closed magnetic circuit, the flux in either leg C or leg D must then switch to a downward direction to balance the core. However, since the magnetic path through leg C is much shorter, and hence of lower reluctance, than the magnetic path through leg D, leg C will switch so that the flux therein assumes a downward direction. At this point, the core is in a quiescent state with a binary "1" stored therein as shown in FIG. 1B of the drawings. By comparing the flux patterns in the core for its two quiescent states, as evidenced by the solid arrows in FIGS. 1A and 1B, it may be seen that two different flux patterns are possible for legs C and D of the core. In FIG. 1A, the downward direction of flux in leg D indicates that a binary "0" is stored in the core, while the upward direction of flux in leg D in FIG. 1B indicates that a binary "1" is stored.

Assuming now that it is desired to read out the core to determine what bit of information is stored in the core, the drive windings 16 and 17 are simultaneously energized in the read polarity as shown by the arrows adjacent the windings. With the drive windings energized in this manner, a clockwise flux pattern is set up in the main flux path of the core and leg A of the core switches, so that the flux therein assumes an upward direction as shown by the dotted arrow. Inasmuch as leg C is already saturated in a downward direction, the direction of flux in leg D reverses to assume the downward direction shown by the dotted arrow in that leg. Since the direction of flux in leg D has reversed, an output pulse is produced in winding 18 to indicate that a binary "1" is being read out of the core. Had a binary "0" been stored in the core, the flux in leg D would not have reversed and there would not have been any output pulse produced in winding 18. Therefore, an output pulse in winding 18 during a read operation indicates that a binary "1" is being read out, while the absence of a pulse in winding 18 during a read operation indicates that a binary "0" is being read out. It should be pointed out at this time that an output pulse is also produced in winding 18 during a write operation, since a flux reversal takes place in leg D at that time also. However, this output pulse will be of a different polarity than the output pulse occurring during a reading operation, with the result that output pulses having a polarity different from that occurring during a reading operation may be ignored. At the end of the reading operation, when the drive windings 16 and 17 are deenergized, the bias in leg A becomes effective to reverse the flux in that leg to its normal downward direction. Again, since the flux path through leg C is shorter than the flux path through leg D, the flux in leg C reverses to assume an upward direction and thereby balance the core. Accordingly, at this time, the core is returned to the quiescent state shown in FIG. 1A as having a stored binary "0" therein.

From the foregoing analysis of the core device of FIGS. 1A and 1B, it is believed apparent that before the core can be switched to either of its stable magnetic states, the bias in either leg A or leg B must be overcome by the joint operation of drive windings 16 and 17. If only one of the drive windings is pulsed, as for example in a half-select operation, the effect of the bias in either leg A or leg B cannot be overcome, so that the flux pattern in legs C and D will remain unchanged. This feature permits both two-dimensional reading and two dimensional writing functions to be obtained and thereby permits the core to be used in magnetic storage matrices. It will be noted, however, that after a binary "1" has been written into the core, the core cannot be returned to the stored binary "0" state before the next reading operation, since it is the reading operation itself which returns the core to the stored binary "0" state. Therefore, the core device of FIGS. 1A and 1B cannot be cleared before reading.

Figure 2:
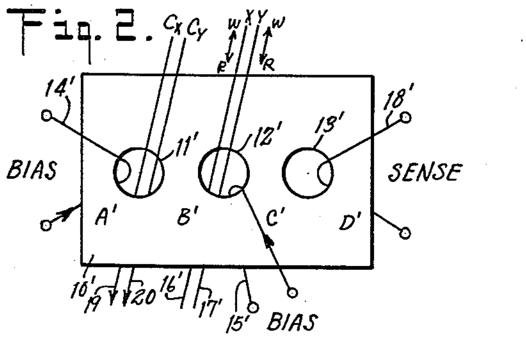
FIG. 2 is a schematic diagram of a magnetic core device constructed in accordance with the teachings of the present invention.

Referring now to FIG. 2 of the drawings, there is shown the magnetic core device of the invention, which does permit the core to be cleared before a reading operation. As seen in FIG. 2, the magnetic core device of the invention comprises a core 10′ of magnetic material having two stable magnetic states. Aperatures 11′, 12′ and 13′ are formed in the core and respectively serve to define legs A′, B′, C′, and D′. Bias windings 14′ and 15′ are arranged to saturate legs A′ and B′ in opposite directions. Again, the magnitude of bias current in winding 14′ would be twice the magnitude of the bias current in winding 15′. Drive windings 16′ and 17′ are arranged to intersect aperture 12′ and to link the closed magnetic circuit defined by the core 10′. Winding 16′ is designated as the "X" winding, while winding 17′ is designated as the "Y" winding to indicate that the core device is capable of two-dimensional reading and writing. A sense or output winding 18′ is arranged to intersect aperture 13′ and to link leg D′ of the core. As thus far described, the magnetic core device of the invention is constructed in the same manner as the core device of FIGS. 1A and 1B. However, clear windings 19 and 20 are arranged to intersect aperture 11′ and to link leg A′ of the core. Winding 19 is designated as "$C_X$" while winding 20 is designated as "$C_Y$," to indicate that the core may be employed for two-dimensional clearing operation when it is utilized in a storage matrix. Bias windings 14′ and 15′, sense winding 18′, and drive windings 16′ and 17′ perform the same functions as the correspondingly numbered elements in the magnetic core device of FIGS. 1A and 1B and will accordingly not be described further herein. Clear windings 19 and 20 are utilized for the purpose of clearing the core after a writing operation. When the clear windings are simultaneously energized with a drive current of the polarity shown in FIG. 2, they provide a clockwise flux pattern in the main flux path of the core. This opposes the bias in leg A′ of the core an causes the flux in leg D′ to assume a downward direction. Since the downward direction of flux in leg D′ is assumed to indicate a stored binary "0," the core is cleared. It is believed that the basic operation of the magnetic core device of the invention will become more readily apparent from the following discussion of an operating sequence as illustrated in FIGS. 3–13 of the drawings.

Figure 5:
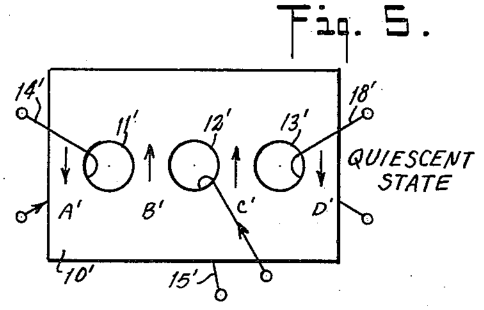
Figure 3:
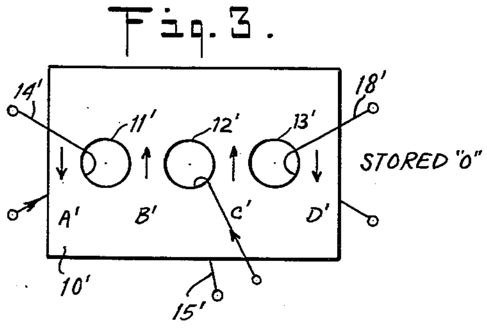

In FIG. 3 of the drawings, the magnetic core device of FIG. 2 is shown in a quiescent state with with a binary "0" stored therein. Again, a downward direction of flux in leg D′ is arbitrarily designated as a stored binary "0," while an upward direction of flux in that leg is designated as a stored binary "1." It should be noted that with the core in a quiescent states, the bias windings 14′ and 15′ maintain the flux in leg A′ in a downward direction and the flux in leg B′ in an upward direction, while the flux in legs C′ and D′ assume directions dependent upon the previous magnetic history of the core. Since the core defines a closed magnetic circuit with legs A′ and B′ connected in parallel and legs C′ and D′ connected in parallel, at any given instant the flux in two of the legs must be in an upward direction, and the flux in the remaining two legs in a downward direction. Assuming now that it is desired to read out the binary "0" stored in the magnetic core device, the drive windings 16′ and 17′ are energized in the polarity shown in FIG. 4 of the drawings, so that a clockwise flux pattern is set up in the main flux path of the core. Since leg B′ is already saturated in an upward direction, leg A′ switches and the flux therein assumes an upward direction. Similarly, since leg D′ is already saturated in a downward direction, the flux in leg C′ switches to assume a downward direction. Accordingly, the flux in leg D′ does not change in direction, so that no output pulse is produced in sense winding 18′, to thereby indicate that a binary "0" is being read out. When the read pulses applied to drive windings 16′ and 17′ end, the bias in leg A′ once more becomes effective to cause the flux in that leg to assume its normal downward direction. Leg C′ switches to an upward direction, since the flux path through that leg is shorter than the path through leg D′. Accordingly, the core is now in a balanced quiescent state as shown in FIG. 5 of the drawings. It may be noted that the reading operation did not disturb the basic flux pattern of the core, as evidenced by a comparison of FIGS. 3 and 5 of the drawings.

Figure 6:
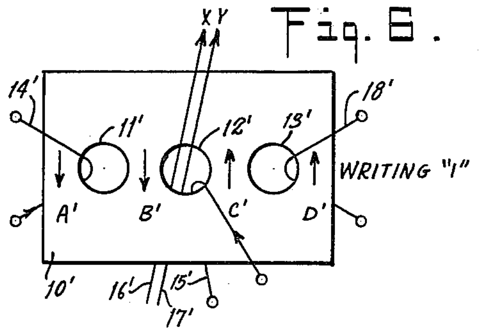
Figure 7:
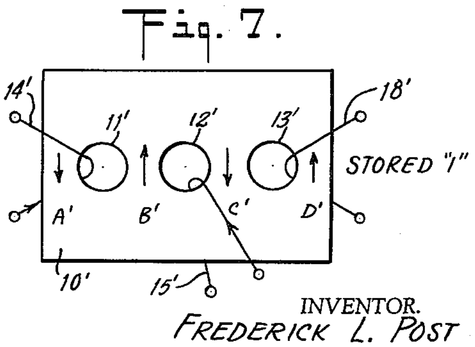

Assuming next, that it is desired to write a binary "1" into the magnetic core device, the drive windings 16′ and 17′ are simultaneously energized in the polarity shown in FIG. 6 of the drawings, to thereby produce a counterclockwise flux pattern in the main flux path of the core. Inasmuch as leg A′ is already saturated in a downward direction, the flux in leg B′ switches to assume the downward direction. Similarly, the flux in leg C′ is already saturated in an upward direction, so that the flux in leg D′ reverses to assume the upward direction illustrated. At this time, an output pulse is produced in sense winding 18′ because of the reversal of flux in D′ of the core. However, since the polarity of this pulse is the opposite of the polarity existing during a reading operation, this pulse may be ignored. When the drive windings 16′ and 17′ are deenergized, the bias in leg B′ of the core once more becomes effective to cause the flux in that leg to resume its normal upward direction. Again, the flux in leg C′ of the core switches to assume a downward direction to thereby balance the core. The quiescent state existing after the writing operation is completed is illustrated in FIG. 7 of the drawings, wherein it is seen that the flux in leg D′ is in an upward direction to indicate that a binary "1" is stored in the device.

Figure 8:
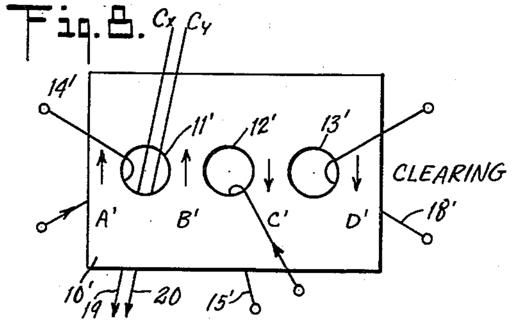
Figure 9:
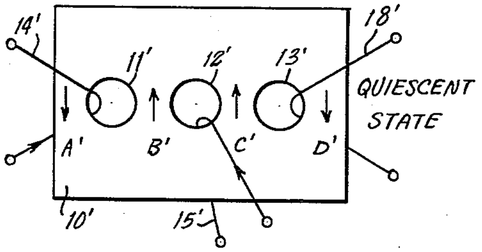
Figure 13:
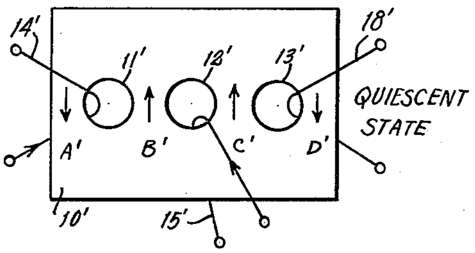

As thus far described, the operation of the magnetic core device of the invention is identical with that of the magnetic core device illustrated in FIGS. 1A and 1B of the drawings. However, unlike the core device of FIGS. 1A and 1B, the magnetic core device of the invention provides means for clearing the core before a reading operation is performed. To accomplish this, the clear windings 19 and 20 are simultaneously energized in the polarity shown in FIG. 8 of the drawings to produce a clockwise flux pattern in the main flux path of the core. As seen in FIG. 8, the energization of clear windings 19 and 20 overcomes the bias in leg A′ of the core and causes the flux in that leg to switch to an upward direction. Since the flux in leg B′ of the core is biased to an upward direction it will not switch. Similarly, since leg C′ is already saturated in a downward direction, the flux in leg D′ must switch to assume the downward direction. When the clear windings 19 and 20 are deenergized, the core returns to a quiescent state as illustrated in FIG. 9 of the drawings. As seen in FIG. 9, the bias in leg A′ becomes effective to cause the flux in that leg to once more assume its normal downward direction. Again, since the flux path through leg C′ is shorter than the flux path through leg D′, the flux in leg C′ reverses to assume an upward direction to thereby balance the core. At this time, the flux in leg D′ is in the downward direction to thereby indicate that a binary "0" is stored in the core device. Accordingly, joint operation of the clear windings 19 and 20 has effectively cleared the core.

Figure 10:
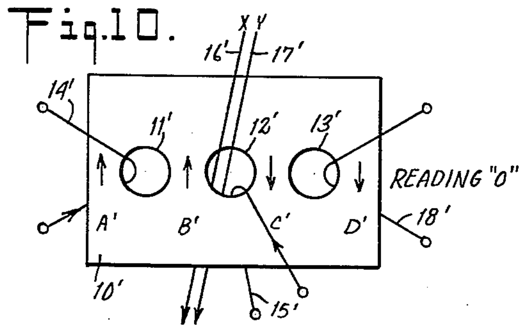

When the next reading operation is performed by energizing drive windings 16' and 17' in the read polarity, as shown in FIG. 10, a clockwise flux pattern is set up in the main flux path of the core. Since the flux in leg B' is already saturated in an upward direction, the flux in leg A' switches to assume an upward direction. In a like manner, the flux in leg C' switches to assume a downward direction. Because of the fact that the flux in leg D' was not changed in direction, no output pulse is produced in sense winding 18', to thereby indicate that a binary "0" is being read out. Accordingly, the performance of a reading operation following a clearing operation always produces an indication of a stored binary "0" in the core. At the conclusion of the reading operation, the bias in leg A' once more becomes effective to cause the flux in that leg to assume its normal downward direction.

Figure 11:
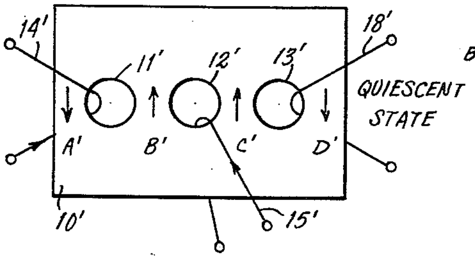

Again, since the flux path through leg C' is shorter than the flux path through leg D', the flux in leg C' switches to assume an upward direction. At this time, the core is returned to its quiescent state, as illustrated in FIG. 11 of the drawings.

Figure 12:
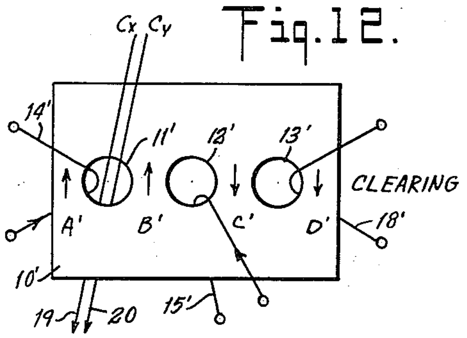

The foregoing description of the operation of the magnetic core device of the invention has demonstrated that the core can be cleared after a binary "1" has been stored therein, so that a subsequent reading operation indicates that a binary "0" is being read out. In order to demonstrate the effect of driving the clear windings 19 and 20 when a binary "0" is stored in the core device, it may be assumed that the core shown in FIG. 11 is subjected to a clearing operation. When the clear windings 19 and 20 are simultaneously energized in the proper polarity, as shown in FIG. 12 of the drawings, the flux in leg A' switches to assume an upward direction. Inasmuch as leg D' is already saturated in a downward direction, the flux in leg C' switches to a downward direction to balance the core. No output pulse will be produced in sense winding 18' since there is no reversal of the flux in that leg. At the conclusion of the clearing operation, the bias in leg A' becomes effective to return the flux in that leg to its normal downward direction. Since the flux path through leg C' is shorter than the flux path through leg D', the flux in leg C' switches to assume an upward direction. Therefore, the core is returned to the quiescent state shown in FIG. 13 of the drawings. It is believed evident from a comparison of FIGS. 11 and 13 that the clearing operation has had no effect on the flux pattern of the core device, since a binary "0" was stored in the core prior to the clearing operation. It will be understood that the clear windings 19 and 20, like the drive windings 16' and 17', must be simultaneously energized in order to clear the core. When only one of the clear windings 19 and 20 is energized, it is insufficient to overcome the bias in leg A' of the core and therefore does not alter the flux pattern of the core to clear it. If desired, however, a single clear winding could be utilized to clear the core. In this event, the magnitude of the drive pulse applied to the single winding would be doubled, so that the same net magnetomotive force would be applied to the core.

While particular directions of flux and polarities of bias, drive and clear currents in the above description and drawings have been chosen to produce a particular operating pattern, it will be understood that different directions of flux and polarities of current could be utilized, depending of course, upon the operational logic of the system in which the magnetic core device is to be used. For example, a downward direction of flux in leg D' could be arbitrarily designated as a stored binary "1" rather than a stored binary "0." Similarly, the sense winding 18' could be arranged to link leg C' of the core rather than leg D', if it were desired that the reading out of a binary "0" be manifested by a pulse rather than the absence of a pulse. Furthermore, as explained in the aforementioned Raker application, the core 10' may assume other shapes than that illustrated herein. For example, the core may be a toroidal core and may even have square apertures rather than circular apertures. Additionally, while single turns are shown for the different windings, it will be understood that plural turns could be employed with equal effectiveness.

Figure 14:
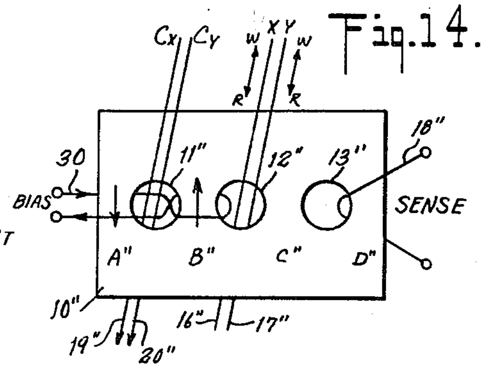
FIG. 14 is a schematic diagram of the magnetic core device of the invention having a modified bias winding arrangement.

FIG. 14 of the drawings illustrates a magnetic core device constructed in accordance with the teachings of the invention and identical with the embodiment of FIG. 2 of the drawings except for the configuration of the bias winding means. In this figure, the same reference characters, but with a double prime notation, are employed for the elements which are common to both embodiments so that a detailed description is believed unnecessary. However, it may be noted that a single bias winding 30 replaces the two separate bias windings 14' and 15' in the arrangement of FIG. 2. The bias winding 30 is arranged in a figure 8 configuration, so that it links both legs A'' and B'' of the core 10''. As explained in the aforementioned Raker application, since the winding 30 intersects aperture 11'' twice and aperture 12'' only once, the bias produced in legs A'' and B'' is exactly the same as that obtained by the use of two separate windings 14' and 15'. Because the operation of the magnetic core device with this bias configuration is identical with that of the embodiment of FIG. 2, it will not be described herein.

Figure 15:
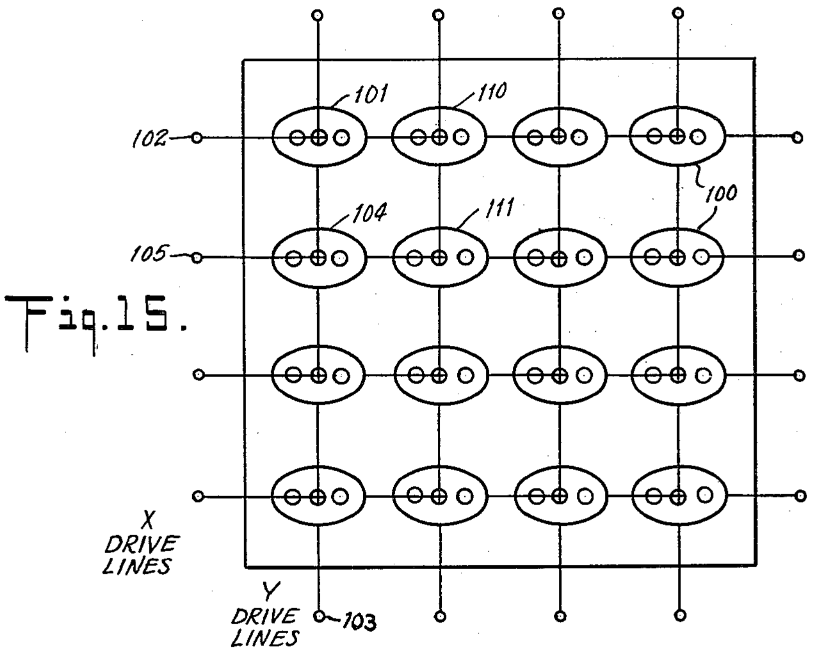
FIGS. 15–19 are schematic diagrams of a magnetic memory array utilizing the magnetic core devices of the invention.

As explained hereinbefore, the magnetic core device of the invention could be employed in the clear memory plane of the system for logically clearing memory described in the copending patent application of Buchholz et al., Serial No. 783,754, filed December 30, 1958. When the core devices are employed for this purpose, each core device in the clear memory plane is associated with a particular stack of "register" of cores in the main memory and serves to indicate by the storage of a binary "0" or a binary "1," whether or not that register has usable information stored therein. Since the system of the Buchholz et al. application does not physically clear the cores of the main memory when the corresponding core devices of the clear memory plane are cleared, but merely "simulates" such clearing, the clear windings for the core devices of the clear memory plane link only the cores of that plane. FIGS. 15–19 of the drawings illustrate a magnetic memory array which is suitable for use as a clear memory plane, wherein provision is made for the simultaneous clearing of two cores at a time. For simplicity of illustration, the drive windings, bias windings, sense windings and clear windings are shown in separate figures. As seen in FIG. 15 of the drawings, the magnetic memory array comprises a "4 x 4" arrangement of the magnetic core devices of the invention, so that a total of 16 cores are utilized. The cores 100 are arranged in rows and columns with an individual drive winding linking the cores of each row and column. The drive windings for the rows have been designated as the "X drive lines," while the drive windings for the columns have been designated as the "Y drive lines." Therefore, in order to select a particular core of the array, for example core 101, for a reading or writing operation, it is necessary to simultaneously energize drive windings 102 and 103, to thereby "fully select" that core. Similarly, in order to fully select core 104 for a reading or writing operation, drive lines 105 and 103 would be simultaneously energized. By this means, it is possible to select any core of the array for a reading or writing operation independently of the other cores of the array.

Figure 16:
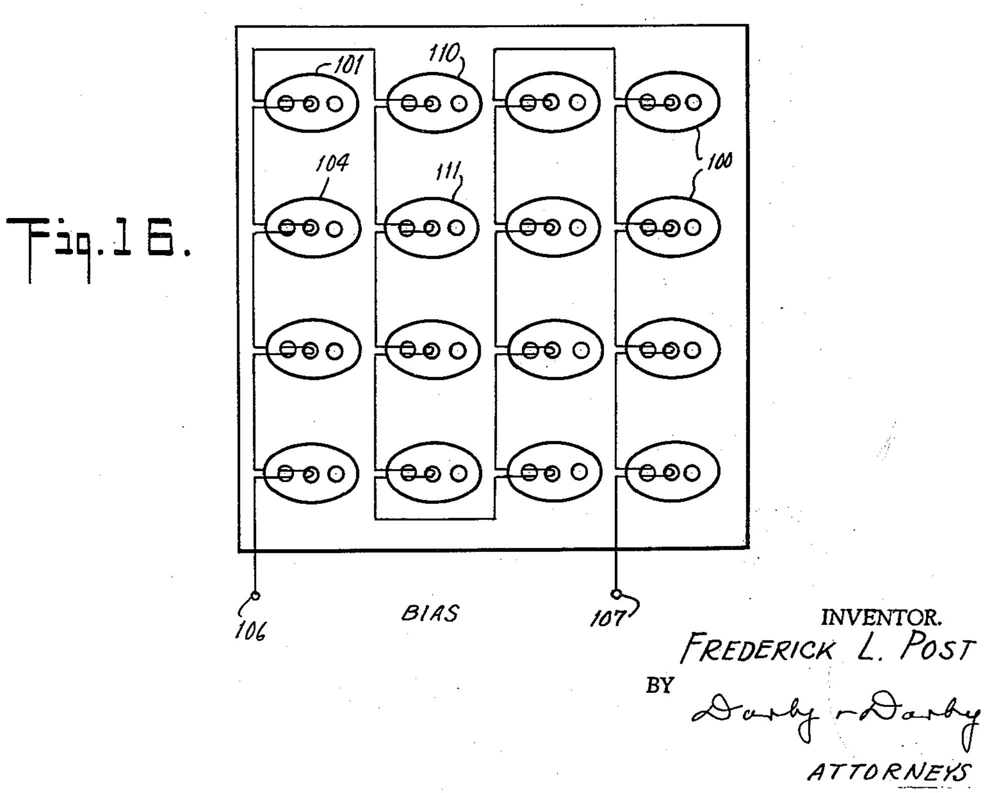
Figure 17:
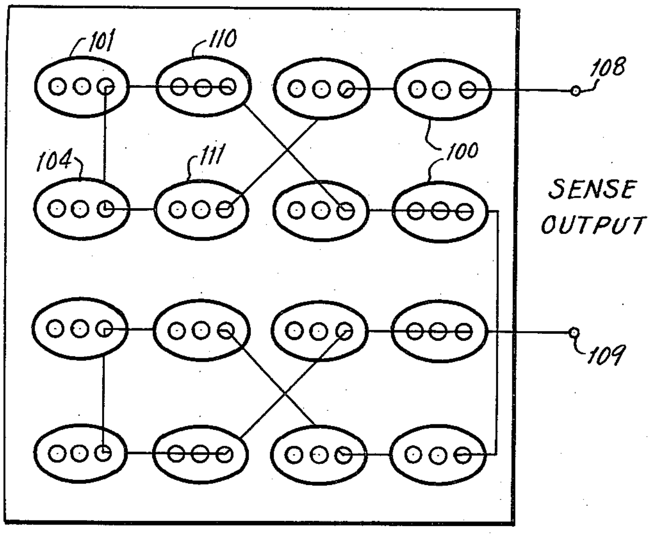
Figure 18:
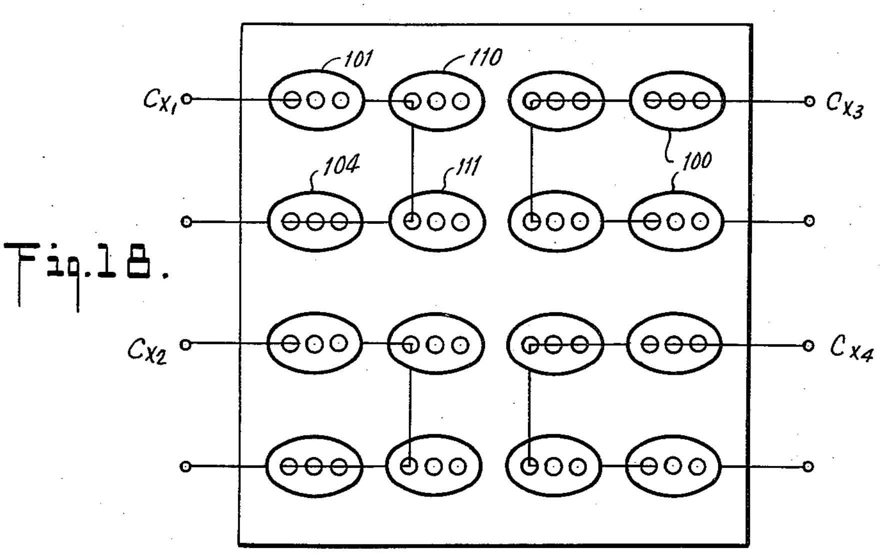
Figure 19:
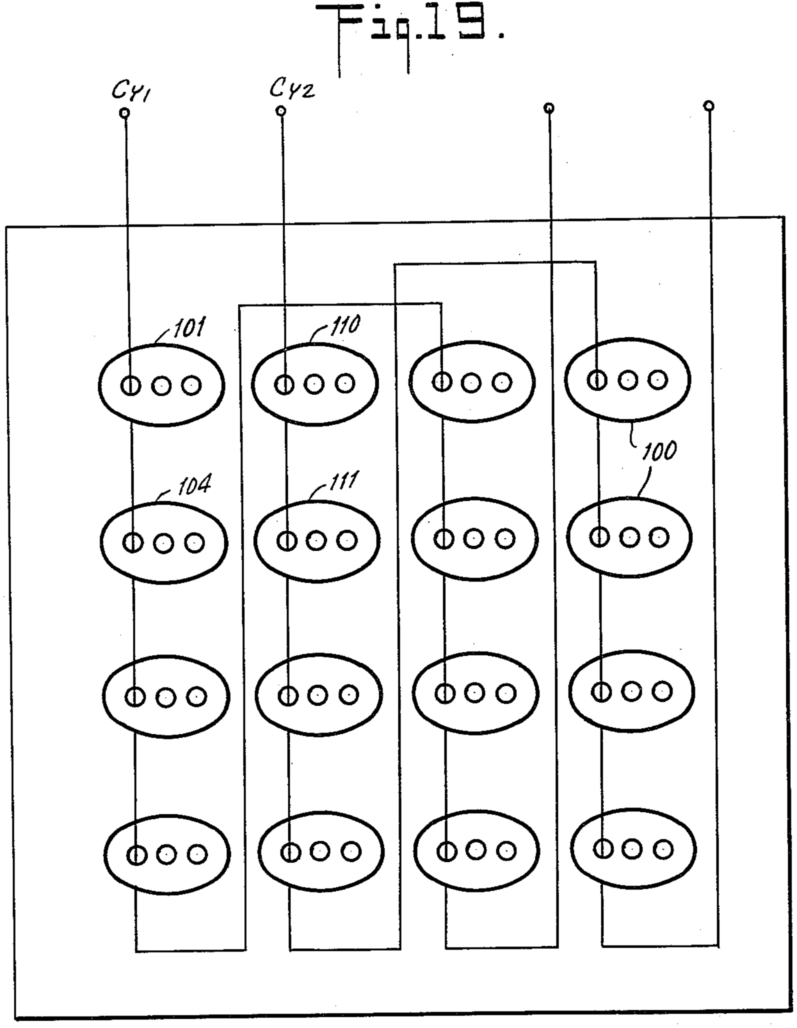

As seen in FIG. 16 of the drawings, the bias windings for each of the cores 100 are connected in a series-circuit to the terminals 106 and 107 of a source (not shown) of bias supply current. It may be noted that the magnetic core devices used in the magnetic memory array may employ the figure 8 bias winding configuration, as illustrated. Similarly, the sense windings of the core devices of the array are connected in series-circuit, as shown in FIG. 17 of the drawings. Therefore, the output pulses appearing in any of the output windings of the core devices will appear at a pair of output terminals 108 and 109 for the magnetic memory array. The clear windings of the magnetic core devices for the "X" direction are shown in FIG. 18 of the drawings. As seen in FIG. 18, there are four clear windings for the "X" direction, designated respectively as $C_{x1}$, $C_{x2}$, $C_{x3}$, and $C_{x4}$. Each of the clear windings for the "X" direction links four of the cores in the plane. For example, clear winding $C_{x1}$ links cores 101, 110, 104 and 111, so that energization of this wire half-selects these four cores for the clearing operation. FIG. 19 of the drawings illustrates the clear windings for the "Y" direction. As seen therein, there are two clear windings employed for the "Y" direction. The first clear winding $C_{y1}$ links eight cores, while the second winding $C_{y2}$ links the remaining eight cores.

By virtue of this arrangement it is possible to simultaneously clear two of the cores of the plane at the same time by energizing the proper $C_x$ and $C_y$ clear windings. For example, to clear cores 101 and 104, clear windings $C_{x1}$ and $C_{y1}$ would be simultaneously energized. Similarly, to clear cores 110 and 111, it would be necessary to simultaneously energize clear windings $C_{x1}$ and $C_{y2}$. Accordingly, by the appropriate selection of the $C_x$ and $C_y$ clear windings, it is possible to simultaneously clear any two cores in the plane. While the illustrated and described magnetic memory array makes provision for the clearing of two cores at a time, it will be understood that other numbers of cores may be simultaneously cleared by suitably arranging the clear windings. For example, if it is desired to clear the entire array in one operation, a single clear winding linking all of the cores of the array could be used. Furthermore, if it is desired to clear only a single core at a time, separate clear windings could be used for each row and column in the same manner as the main drive windings. Similarly, by suitably arraying the clear windings, a section of the array comprising any number of coils may be simultaneously cleared.

While there have been shown, described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only by the scope of the following claims.

What is claimed is:

1. A magnetic core device comprising means defining a magnetic circuit having at least a pair of input flux paths, an output flux path and a main flux path coupling said input flux paths to said output flux path; means for magnetically biasing one of said input paths to saturation in a first direction and the other of said input paths to saturation in a second direction; first drive means for selectively driving said one input flux path to saturation in said second direction to thereby establish a flux pattern in the main flux path in said second direction and for driving said other input flux path to saturation in said first direction to thereby establish a flux pattern in the main flux path in said first direction; output means for detecting a change in the flux pattern in said output flux path; and second selectively operable drive means for driving said one input flux path to saturation in said second direction independently of said first drive means, to thereby establish a flux pattern in the main flux path in said second direction.

2. A magnetic core device comprising means defining a magnetic circuit having first and second pairs of flux paths and a main flux path coupling said pairs of flux paths together; means for magnetically biasing one path of said first pair of flux paths to saturation in a first direction and the other path of said first pair of flux paths to saturation in a second direction; first drive means for selectively driving said one path of said first pair of paths to saturation in said second direction to thereby establish a flux pattern in said main flux path in said second direction and for driving said other path of said first pair of paths to saturation in said first direction to thereby establish a flux pattern in said main flux path in said first direction; output means coupled to one path of said second pair of flux paths for detecting a change in the flux pattern therein; and second selectively operable drive means for driving said one path of said first pair of paths to saturation in said second direction independently of said first drive means, to thereby establish a flux pattern in said main flux path in said second direction.

3. A magnetic core device comprising means defining a magnetic circuit having first and second pairs of parallel-connected flux paths and a main flux path serially connecting said pairs of flux paths together; bias means for magnetically biasing one path of said first pair of flux paths to saturation in a first direction and the other path of said first pair of paths to saturation in a second direction; first drive means coupled to said main flux path for selectively driving said one path of the first pair of paths to saturation in said second direction to thereby establish a flux pattern in said main flux path in said second direction and for driving said other path of the first pair of paths to saturation in said first direction to thereby establish a flux pattern in said main flux path in said first direction; output means coupled to one path of said second pair of flux paths for detecting a change in the flux pattern therein; and second selectively operable drive means coupled to said one path of said first pair of paths for driving said one path of the first pair of paths to saturation in said second direction independently of said first drive means, to thereby establish a flux pattern in said main flux path in said second direction.

4. A magnetic core device as claimed in claim 3, wherein said bias means comprises means coupled to both paths of said first pair of flux paths.

5. A magnetic core device as claimed in claim 3, wherein said bias means comprises first bias means coupled to said one path of said first pair of flux paths and second bias means coupled to said main flux path.

6. A magnetic core device as claimed in claim 3, wherein both said first and second drive means comprises a pair of selectively operable drive means, each drive means of each pair of drive means being independently inoperable to establish a flux pattern in said main flux path and being jointly operable with the other drive means of the pair to establish a flux pattern in said main flux path.

7. A magnetic core device comprising a core of magnetic material having first and second stable magnetic states and defining a closed magnetic circuit having first, second, third and fourth portions; bias winding means linking said core for magnetically biasing said first circuit portion to said first magnetic state and said second circuit portion to said second magnetic state; main drive winding means linking said magnetic circuit for selectively driving said first circuit portion to said second magnetic state to thereby with the bias applied to said second circuit portion drive said third and fourth circuit portions to said first magnetic state and for driving said second circuit portion to said first magnetic state to thereby with the bias applied to said first circuit portion drive said third and fourth circuit portions to said second magnetic state; output winding means linking one of said third and fourth circuit portions for sensing a change in the magnetic state thereof; and auxiliary selectively operable drive winding means linking said first circuit portion for driving said first circuit portion to said second magnetic state, to thereby drive said third and fourth circuit portions to said first magnetic state independently of said main drive winding means.

8. A magnetic core device as claimed in claim 7, wherein said first and second circuit portions are connected in parallel and said third and fourth circuit portions are connected in parallel.

9. A magnetic core device as claimed in claim 8, wherein said bias winding means comprises a bias winding linking both of said first and second circuit portions.

10. A magnetic core device as claimed in claim 8, wherein said bias winding means comprises a first bias winding linking said first circuit portion and a second bias winding linking said magnetic circuit.

11. A magnetic cored device as claimed in claim 8, wherein at least one of said drive winding means comprises a plurality of independently selectively operable drive windings.

12. A magnetic memory device comprising a multilegged core of magnetic material having first and second stable magnetic states, said core defining a closed magnetic circuit and having first, second and third apertures respectively defining first, second, third and fourth legs, said second and third legs respectively magnetically shunting said first and fourth legs; bias winding means intersecting said first and second apertures for magnetically biasing said first leg to said first magnetic state and said second leg to said second magnetic state; main drive winding means intersecting said second aperture and linking said magnetic circuit for selectively driving said first leg to said second magnetic state to thereby with the bias applied to said second leg drive said third and fourth legs to said first magnetic state and establish a flux pattern in said magnetic circuit in one direction and for driving said second leg to said first magnetic state to thereby with the bias applied to said first leg drive said third and fourth legs to said second magnetic state and establish a flux pattern in said magnetic circuit in the opposite direction; output winding means intersecting said third aperture and linking one of said third and fourth legs for sensing a change in the magnetic state of said one leg; and auxiliary selectively operable drive winding means intersecting said first aperture and linking said first leg for driving said first leg to said second magnetic state, to thereby with the bias applied to said second leg drive said third and fourth legs to said first magnetic state and independently of said main drive winding means establish a flux pattern in said magnetic circuit in said one direction.

13. A magnetic memory device as claimed in claim 12, wherein said bias winding means comprises a bias winding linking said first and second legs and intersecting said first aperture twice for every intersection of said second aperture.

14. A magnetic memory device as claimed in claim 12, wherein said bias winding means comprises a first bias winding linking said first leg and intersecting said first aperture and a second bias winding linking said magnetic circuit and intersecting said second aperture.

15. A magnetic memory device as claimed in claim 12, wherein at least one of said drive winding means comprises first and second selectively operable drive windings, said first and second drive windings being individually inoperable to establish a flux pattern in said magnetic circuit and being jointly operable with each other to establish a flux pattern in said magnetic circuit, whereby joint operation of said first and second drive windings is required to alter the magnetic states of said third and fourth legs.

16. A magnetic memory array comprising a plurality of groups of magnetic core devices, each of said groups containing the same number of core devices, each of said core devices comprising a core of magnetic material having first and second stable magnetic states and defining a closed magnetic circuit having first, second, third and fourth portions; bias winding means linking the core of each of said core devices for magnetically biasing said first circuit portion to said first magnetic state and said second circuit portion to said second magnetic state; first and second drive winding means, said first drive winding means linking the magnetic circuits of the core devices in a group, said second drive winding means linking the magnetic circuits of a corresponding core device in each of said groups so that the magnetic circuit of each of said core devices is linked by different ones of said first and second drive winding means and may be independently driven, said first and second drive winding means being jointly operable to selectively drive said first circuit portion of said core devices to said second magnetic state to thereby with the bias applied to said second circuit portion drive said third and fourth circuit portions to said first magnetic state and establish the core as cleared and to drive said second circuit portion to said first magnetic state to thereby with the bias applied to said first circuit portion drive said third and fourth circuit portions to said second magnetic state and establish the core as not cleared; output winding means linking one of said third and fourth circuit portions of each of said core devices for sensing a change in the magnetic state thereof; and selectively operable clear winding means linking said first circuit portion of each of said core devices for driving said first circuit portion to said second magnetic state, to thereby with the bias applied to said second circuit portion drive said third and fourth circuit portions to said first magnetic state, whereby each of said magnetic core devices may be cleared independently of said first and second drive winding means.

17. A magnetic memory array as claimed in claim 16, wherein said clear winding means comprises first and second clear winding means each linking the first circuit portions of predetermined ones of said core devices, so that at least an individual one of said core devices may be independently cleared by the joint operation of the particular first and second clear winding means associated therewith.

18. A magnetic memory array as claimed in claim 17, wherein all of the core devices in a section of the array are linked by the same ones of said first and second clear winding means, so that all of the core devices in that section may be simultaneously cleared by the joint operation of the particular first and second clear winding means associated with that section.

References Cited in the file of this patent

UNITED STATES PATENTS

| | | |
|---|---|---|
| 2,923,923 | Raker | Feb. 2, 1960 |
| 2,929,342 | Rogers | Feb. 23, 1960 |

OTHER REFERENCES

Publication: "Multihole Ferrite Core Configurations and Applications," from proceedings of the I.R.E., pp, 1081–1093, August 1957.